(12) United States Patent
Mellet et al.

(10) Patent No.: US 8,888,648 B2
(45) Date of Patent: *Nov. 18, 2014

(54) MULTI-SPEED TRANSMISSION

(71) Applicant: GM Global Technology Operations LLC, Detroit, MI (US)

(72) Inventors: Edward W. Mellet, Rochester Hills, MI (US); James M. Hart, Belleville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,716

(22) Filed: Jan. 17, 2013

(65) Prior Publication Data

US 2013/0210570 A1      Aug. 15, 2013

Related U.S. Application Data

(60) Provisional application No. 61/597,393, filed on Feb. 10, 2012.

(51) Int. Cl.
*F16H 3/62*      (2006.01)
*F16H 3/66*      (2006.01)

(52) U.S. Cl.
CPC .......... *F16H 3/62* (2013.01); *F16H 2200/2046* (2013.01); *F16H 2200/2012* (2013.01); *F16H 3/66* (2013.01); *F16H 2200/0069* (2013.01)
USPC ........................................................ 475/275

(58) Field of Classification Search
None
See application file for complete search history.

(56) References Cited

U.S. PATENT DOCUMENTS

| | | | |
|---|---|---|---|
| 6,991,578 B2 | 1/2006 | Ziemer | |
| 7,011,597 B2 | 3/2006 | Haka | |
| 7,018,319 B2 | 3/2006 | Ziemer | |
| 7,686,730 B2 * | 3/2010 | Baldwin | 475/276 |
| 7,722,496 B2 * | 5/2010 | Phillips et al. | 475/276 |
| 7,731,625 B2 * | 6/2010 | Phillips et al. | 475/284 |
| 7,736,262 B2 * | 6/2010 | Suh | 475/276 |
| 7,736,263 B2 * | 6/2010 | Phillips et al. | 475/277 |
| 7,828,690 B2 * | 11/2010 | Wittkopp et al. | 475/280 |
| 7,846,057 B2 * | 12/2010 | Shim | 475/275 |
| 7,909,726 B2 * | 3/2011 | Phillips et al. | 475/282 |
| 7,959,531 B2 * | 6/2011 | Phillips et al. | 475/276 |
| 7,988,586 B2 * | 8/2011 | Phillips et al. | 475/275 |
| 7,998,013 B2 * | 8/2011 | Phillips et al. | 475/276 |
| 8,007,395 B2 * | 8/2011 | Wittkopp et al. | 475/275 |
| 8,038,565 B2 * | 10/2011 | Phillips et al. | 475/276 |
| 8,047,951 B2 * | 11/2011 | Wittkopp et al. | 475/282 |
| 8,157,697 B2 * | 4/2012 | Hart et al. | 475/277 |
| 8,167,766 B2 * | 5/2012 | Phillips et al. | 475/276 |
| 8,231,496 B2 * | 7/2012 | Gumpoltsberger et al. | 475/275 |
| 8,246,504 B2 * | 8/2012 | Gumpoltsberger et al. | 475/286 |
| 8,251,859 B2 * | 8/2012 | Gumpoltsberger et al. | 475/284 |
| 8,303,455 B2 * | 11/2012 | Gumpoltsberger et al. | 475/280 |
| 8,409,047 B2 * | 4/2013 | Borgerson et al. | 475/284 |
| 8,414,445 B2 * | 4/2013 | Carey et al. | 475/275 |
| 8,425,367 B2 * | 4/2013 | Phillips et al. | 475/275 |
| 8,465,390 B2 * | 6/2013 | Brehmer et al. | 475/282 |

(Continued)

*Primary Examiner* — Dirk Wright

(57) ABSTRACT

A transmission having an input member, an output member, at least four planetary gear sets, a plurality of coupling members and a plurality of torque transmitting devices. Each of the planetary gear sets includes first, second and third members. The torque transmitting devices include clutches and brakes actuatable in combinations of three to establish a plurality of forward gear ratios and one reverse gear ratio.

19 Claims, 1 Drawing Sheet

(56) References Cited

U.S. PATENT DOCUMENTS

Figures 1, 2:
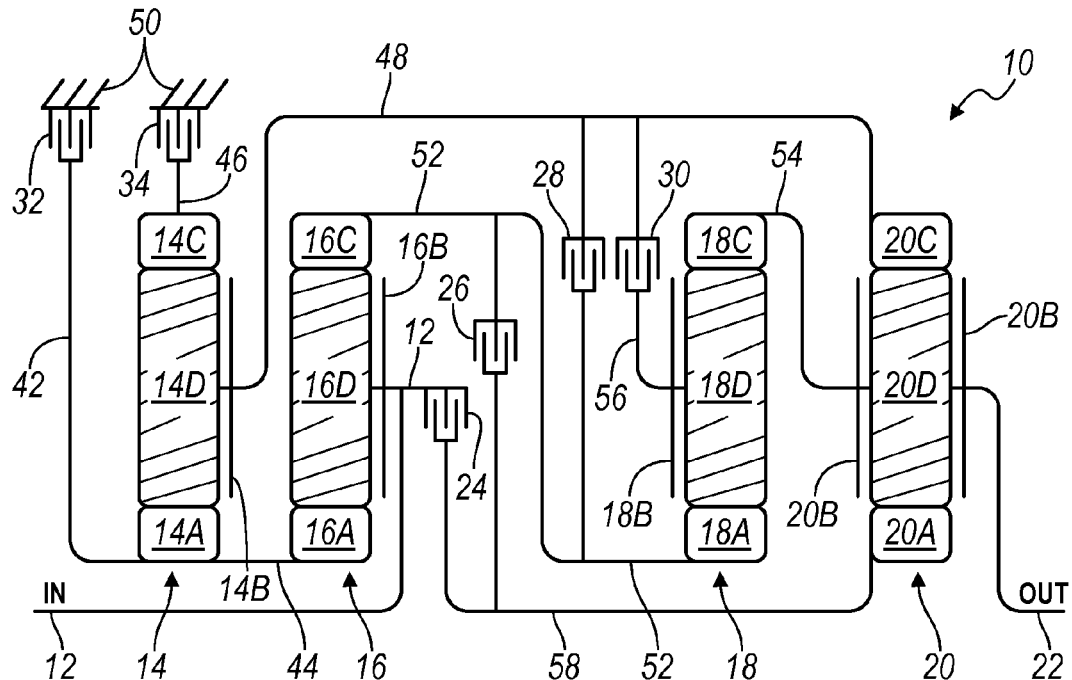

| | | | |
|---|---|---|---|
| 8,506,443 B2 * | 8/2013 | Seo et al. | 475/280 |
| 8,517,886 B2 * | 8/2013 | Seo et al. | 475/288 |
| 8,523,729 B2 * | 9/2013 | Hart et al. | 475/282 |
| 8,574,114 B2 * | 11/2013 | Brehmer et al. | 475/282 |
| 8,597,152 B2 * | 12/2013 | Seo et al. | 475/276 |
| 2013/0023376 A1 * | 1/2013 | Hart et al. | 475/275 |
| 2013/0085033 A1 * | 4/2013 | Wittkopp et al. | 475/275 |
| 2013/0203549 A1 * | 8/2013 | Mellet et al. | 475/276 |
| 2013/0260947 A1 * | 10/2013 | Mellet et al. | 475/276 |
| 2013/0267370 A1 * | 10/2013 | Mellet et al. | 475/276 |
| 2013/0267372 A1 * | 10/2013 | Mellet et al. | 475/276 |

* cited by examiner

| GEAR STATE | GEAR RATIO | RATIO STEP | TORQUE TRANSMITTING ELEMENTS ||||||
|---|---|---|---|---|---|---|---|---|
| | | | 30 | 26 | 24 | 28 | 34 | 32 |
| REV | -2.467 | | X | | | | X | X |
| N | | -0.52 | | | | | | |
| 1ST | 4.700 | | | | X | | X | X |
| 2ND | 3.133 | 1.50 | | X | | | X | X |
| 3RD | 2.104 | 1.49 | | X | X | | X | |
| 4TH | 1.667 | 1.26 | | X | | X | X | |
| 5TH | 1.460 | 1.14 | | | X | X | X | |
| 6TH | 1.315 | 1.11 | X | | | X | X | |
| 7TH | 1.000 | 1.31 | X | X | X | | | |
| 8TH | 0.820 | 1.22 | X | | | X | | X |
| 9TH | 0.718 | 1.14 | | | X | X | | X |
| 10TH | 0.667 | 1.08 | X | | | X | | X |

X = ON - ENGAGED CARRYING TORQUE
O = ON - ENGAGED NOT CARRYING TORQUE

MULTI-SPEED TRANSMISSION

CROSS-REFERENCE TO RELATED APPLICATIONS

This application claims the benefit of U.S. Provisional Patent Application Ser. No. 61/597,393, filed Feb. 10, 2012, which is hereby incorporated in its entirety herein by reference.

FIELD

The invention relates generally to a multiple speed transmission having a plurality of planetary gear sets and a plurality of torque transmitting devices and more particularly to a transmission having four planetary gear sets, a plurality of torque transmitting devices and ten or more speeds.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

In another aspect of the present invention, the transmission has an output member continuously interconnecting the carrier member of the fourth planetary gear set and with the ring gear of the third planetary gear set.

In still another aspect of the present invention, the transmission has a first interconnecting member continuously interconnecting the sun gear of the first planetary gear set with the sun gear of the second planetary gear set.

In still another aspect of the present invention, the transmission has a second interconnecting member continuously interconnecting the carrier member of the first planetary gear set with the ring gear of the fourth planetary gear set.

In still another aspect of the present invention, the transmission has a third interconnecting member continuously interconnecting the ring gear of the second planetary gear set with the sun gear of the third planetary gear set.

In still another aspect of the present invention, the transmission has a fourth interconnecting member continuously interconnecting the ring gear of the third planetary gear set with the carrier member of the fourth planetary gear set.

In still another aspect of the present invention, the transmission has a first torque transmitting device selectively engageable to interconnect the carrier member of the second planetary gear set and the input member with the sun gear of the fourth planetary gear set.

In still another aspect of the present invention, the transmission has a second torque transmitting device selectively engageable to interconnect the ring gear of the second planetary gear set and the sun gear of the third planetary gear set with the sun gear of the fourth planetary gear set.

In still another aspect of the present invention, the transmission has a third torque transmitting device selectively engageable to interconnect the carrier member of the first planetary gear set and the ring gear of the fourth planetary gear set with the sun gear of the third planetary gear set.

In yet another aspect of the present invention, the transmission has a fourth torque transmitting device selectively engageable to interconnect the carrier member of the first planetary gear set and the ring gear of the fourth planetary gear set with the carrier member of the third planetary gear set.

In yet another aspect of the present invention, the transmission has a fifth torque transmitting device selectively engageable to interconnect the sun gear of the first planetary gear set and the sun gear of the second planetary gear set with the stationary member.

In yet another aspect of the present invention, the transmission has a sixth torque transmitting device selectively engageable to interconnect the ring gear of the first planetary gear set with the stationary member.

In yet another aspect of the present invention, the torque transmitting devices of the transmission are each selectively engageable in combinations of at least three to establish a plurality forward speed ratios and at least one reverse speed ratio between the input member and the output member.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 1 is a diagrammatic illustration of an embodiment of a ten speed transmission according to the present invention; and FIG. 2 is a truth table presenting the state of engagement of the various torque transmitting elements in each of the available forward and reverse speeds or gear ratios of the transmission illustrated in FIG. 1.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. For example, a first component or element of the first planetary gear set is permanently coupled a first component or element of the second planetary gear set. A second component or element of a first planetary gear set is permanently coupled to a third component or element of the fourth planetary gear set. A third component or element of the second planetary gear set is permanently coupled to a first component or element of the third planetary gear set. A third component or element of the third planetary gear set is permanently coupled to a second component or element of the fourth planetary gear set.

Referring now to FIG. 1, a stick diagram presents a schematic layout of an embodiment of the ten speed transmission 10 according to the present invention. Ten speed transmission 10 includes four planetary gear sets 14, 16, 18 and 20. As will be described below, each of the planetary gear sets 14, 16, 18 and 20 have a components or members such as a sun gear, a carrier member and a ring gear that are either permanently or selectively interconnected through clutches or brakes to each other or to a transmission housing 50. Transmission 10 is capable of establishing ten gear ratios between an input member 12 and an output member 22.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42 and a second shaft or interconnecting member 44. The ring gear member 14C is connected for common rotation with a third shaft or interconnecting member 46. The planet carrier member 14B is connected for common rotation with a fourth shaft or interconnecting member 48. The planet gears 14D are each configured to intermesh with both the sun gear member 14A and the ring gear member 14C.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the second shaft or interconnecting member 44. The ring gear member 16C is connected for common rotation with a fifth shaft or interconnecting member 52. The planet carrier member 16B is connected for common rotation with the input member 12. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of planet gears 18D (only one of which is shown). The sun gear member 18A is connected for common rotation with a fifth shaft or interconnecting member 52. The ring gear member 18C is connected for common rotation with a sixth shaft or interconnecting member 54. The planet carrier member 18B is connected for common rotation with a seventh shaft or interconnecting member 56. The planet gears 18D are each configured to intermesh with both the sun gear member 18A and the ring gear member 18C.

The planetary gear set 20 includes a sun gear member 20A, a ring gear member 20C and a planet gear carrier member 20B that rotatably supports a set of planet gears 20D (only one of which is shown). The sun gear member 20A is connected for common rotation with an eighth shaft or interconnecting member 58. The ring gear member 20C is connected for common rotation with the fourth shaft or interconnecting member 48. The planet carrier member 20B is connected for common rotation with the sixth shaft or interconnecting member 54 and with the output shaft or member 22. The planet gears 20D are each configured to intermesh with both the sun gear member 20A and the ring gear member 20C.

The input shaft or member 12 is continuously connected to an engine (not shown) or to a turbine of a torque converter (not shown) or to launch device, such as a clutch. The output shaft or member 22 is continuously connected with the final drive unit or transfer case (not shown). Transmission housing 50 supports the planetary gear sets and is bolted or otherwise fastened to the engine.

The torque-transmitting mechanisms or clutches 24, 26, 28, 30 and brakes 32 and 34 allow for selective interconnection of the shafts or interconnecting members, members of the planetary gear sets and the housing. For example, the first clutch 24 is selectively engageable to connect the input shaft or member 12 with the eighth shaft or interconnecting member 58. The second clutch 26 is selectively engageable to connect the fifth shaft or interconnecting member 52 with the eighth shaft or interconnecting member 58. The third clutch 28 is selectively engageable to connect the fourth shaft or interconnecting member 48 with the fifth shaft or interconnecting member 52. The fourth clutch 30 is selectively engageable to connect the fourth shaft or interconnecting member 48 with the seventh shaft or interconnecting member 56. The first brake 32 is selectively engageable to connect the first shaft or interconnecting member 42 with the stationary element or the transmission housing 50 in order to restrict the member 42 from rotating relative to the transmission housing 50. The second brake 34 is selectively engageable to connect the third shaft or interconnecting member 46 with the stationary element or the transmission housing 50 in order to restrict the member 46 from rotating relative to the transmission housing 50.

Referring now to FIG. 1 and FIG. 2, the operation of the ten speed transmission 10 will be described. It will be appreciated that transmission 10 is capable of transmitting torque from the input shaft or member 12 to the output shaft or member 22 in at least ten forward speed or torque ratios and at least one reverse speed or torque ratio. Each forward and reverse speed or torque ratio is attained by engagement of one or more of the torque-transmitting mechanisms (i.e. first clutch 24, second clutch 26, third clutch 28, fourth clutch 30, first brake 32 and second brake 34), as will be explained below. FIG. 2 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

For example to establish a reverse gear, the fourth clutch 30, first brake 32 and second brake 34 are engaged or activated. The fourth clutch 30 connects the fourth shaft or interconnecting member 48 with the seventh shaft or interconnecting member 56. The first brake 32 connects the first shaft or interconnecting member 42 with the stationary element or the transmission housing 50 in order to restrict the member 42 from rotating relative to the transmission housing 50. The second brake 34 connects the third shaft or interconnecting member 46 with the stationary element or the transmission housing 50 in order to restrict the member 46 from rotating relative to the transmission housing 50. Likewise, the ten forward ratios are achieved through different combinations of clutch and brake engagement, as shown in FIG. 2.

It will be appreciated that the foregoing explanation of operation and gear states of the ten speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated. The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
    an input member;
    an output member;
    first, second, third and fourth planetary gear sets each having first, second and third members, wherein the input member is directly interconnected with one of the first, second, and third members of one of the first, second, third, and fourth planetary gear sets and the output member is continuously interconnected with the second member of the fourth planetary gear set and the third member of the third planetary gear set;
    first, second, third and fourth interconnecting member each continuously interconnecting at least one of the members of the planetary gear sets with at least one other member of the planetary gear sets; and
    six torque transmitting devices each selectively engageable to interconnect at least one of the first, second, and third members with at least one other of the first members, second members, third members and a stationary member, and wherein at least one of a plurality forward speed ratios and at least one reverse speed ratio is established by the selective engagement of at least three of the torque transmitting devices.

2. The transmission of claim 1 wherein the first interconnecting member continuously interconnects the first member of the first planetary gear set with the first member of the second planetary gear set, the second interconnecting member continuously interconnects the second member of the first planetary gear set with the third member of the fourth planetary gear set, the third interconnecting member continuously interconnects the third member of the second planetary gear set with the first member of the third planetary gear set, and the fourth interconnecting member continuously interconnects the third member of the third planetary gear set with the second member of the fourth planetary gear set.

3. The transmission of claim 1 wherein a first of the six torque transmitting devices is selectively engageable to interconnect the second member of the second planetary gear set and the input member with the first member of the fourth planetary gear set.

4. The transmission of claim 3 wherein a second of the six torque transmitting devices is selectively engageable to interconnect the third member of the second planetary gear set and the first member of the third planetary gear set with the first member of the fourth planetary gear set.

5. The transmission of claim 4 wherein a third of the six torque transmitting devices is selectively engageable to interconnect the second member of the first planetary gear set and the third member of the fourth planetary gear set with the first member of the third planetary gear set.

6. The transmission of claim 5 wherein a fourth of the six torque transmitting devices is selectively engageable to interconnect the second member of the first planetary gear set and the third member of the fourth planetary gear set with the second member of the third planetary gear set.

7. The transmission of claim 6 wherein a fifth of the six torque transmitting devices is selectively engageable to interconnect the first member of the first planetary gear set and the first member of the second planetary gear set with the stationary member.

8. The transmission of claim 7 wherein a sixth of the six torque transmitting devices is selectively engageable to interconnect the third member of the first planetary gear set with the stationary member.

9. The transmission of claim 1 wherein the second and third planetary gear sets are disposed between the first and fourth the planetary gear sets.

10. The transmission of claim 9 wherein the first planetary gear set is disposed adjacent the second planetary gear set and the third planetary gear set is disposed adjacent the fourth planetary gear set.

11. The transmission of claim 1 wherein the first member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members and the third member of the first planetary gear set, third member of the second planetary gear set, the third member of the third planetary gear set and the third member of the fourth planetary gear set are ring gears.

12. The transmission of claim 1 wherein two of the six torque transmitting devices are brakes and four of the six torque transmitting devices are clutches.

13. The transmission of claim 1 wherein the stationary member is a transmission housing.

14. A transmission comprising:
    an input member;
    an output member;
    first, second, third and fourth planetary gear sets each having first, second and third members, wherein the input member is directly interconnected with the second member of the second planetary gear set and the output member is continuously interconnected the second member of the fourth planetary gear set and the third member of the third planetary gear set;
    a first interconnecting member continuously interconnecting the first member of the first planetary gear set with the first member of the second planetary gear set;
    a second interconnecting member continuously interconnecting the second member of the first planetary gear set with the third member of the fourth planetary gear set;
    a third interconnecting member continuously interconnecting the third member of the second planetary gear set with the first member of the third planetary gear set;
    a fourth interconnecting member continuously interconnecting the third member of the third planetary gear set with the second member of the fourth planetary gear set;
    a first torque transmitting device selectively engageable to interconnect the second member of the second planetary gear set and the input member with the first member of the fourth planetary gear set;
    a second torque transmitting device selectively engageable to interconnect the third member of the second planetary gear set and the first member of the third planetary gear set with the first member of the fourth planetary gear set;
    a third torque transmitting device selectively engageable to interconnect the second member of the first planetary gear set and the third member of the fourth planetary gear set with the first member of the third planetary gear set;

a fourth torque transmitting device selectively engageable to interconnect the second member of the first planetary gear set and the third member of the fourth planetary gear set with the second member of the third planetary gear set;

a fifth torque transmitting device selectively engageable to interconnect the first member of the first planetary gear set and the first member of the second planetary gear set with the stationary member; and a sixth torque transmitting device selectively engageable to interconnect the third member of the first planetary gear set with the stationary member, and wherein the torque transmitting devices are each selectively engageable in combinations of at least three to establish a plurality forward speed ratios and at least one reverse speed ratio between the input member and the output member.

15. The transmission of claim 14 wherein the first member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members and the third member of the first planetary gear set, third member of the second planetary gear set, the third member of the third planetary gear set and the third member of the fourth planetary gear set are ring gears.

16. The transmission of claim 14 wherein the stationary member is a transmission housing.

17. The transmission of claim 14 wherein the second and third planetary gear sets are disposed between the first and fourth the planetary gear sets.

18. The transmission of claim 14 wherein the first planetary gear set is disposed adjacent the second planetary gear set and the third planetary gear set is disposed adjacent the fourth planetary gear set.

19. A transmission comprising:
an input member;
an output member;
first, second, third and fourth planetary gear sets each having a sun gear, a carrier member and a ring gear, wherein the input member is directly interconnected with the carrier member of the second planetary gear set and the output member is continuously interconnected with the carrier member of the fourth planetary gear set and the ring gear of the third planetary gear set;

a first interconnecting member continuously interconnecting the sun gear of the first planetary gear set with the sun gear of the second planetary gear set;

a second interconnecting member continuously interconnecting the carrier member of the first planetary gear set with the ring gear of the fourth planetary gear set;

a third interconnecting member continuously interconnecting the ring gear of the second planetary gear set with the sun gear of the third planetary gear set;

a fourth interconnecting member continuously interconnecting the ring gear of the third planetary gear set with the carrier member of the fourth planetary gear set;

a first torque transmitting device selectively engageable to interconnect the carrier member of the second planetary gear set and the input member with the sun gear of the fourth planetary gear set;

a second torque transmitting device selectively engageable to interconnect the ring gear of the second planetary gear set and the sun gear of the third planetary gear set with the sun gear of the fourth planetary gear set;

a third torque transmitting device selectively engageable to interconnect the carrier member of the first planetary gear set and the ring gear of the fourth planetary gear set with the sun gear of the third planetary gear set;

a fourth torque transmitting device selectively engageable to interconnect the carrier member of the first planetary gear set and the ring gear of the fourth planetary gear set with the carrier member of the third planetary gear set;

a fifth torque transmitting device selectively engageable to interconnect the sun gear of the first planetary gear set and the sun gear of the second planetary gear set with the stationary member; and a sixth torque transmitting device selectively engageable to interconnect the ring gear of the first planetary gear set with the stationary member, and wherein the torque transmitting devices are each selectively engageable in combinations of at least three to establish a plurality forward speed ratios and at least one reverse speed ratio between the input member and the output member.

* * * * *